(12) United States Patent
Otaki (10) Patent No.: US 9,377,637 B2
(45) Date of Patent: Jun. 28, 2016

(54) LASER IRRADIATION APPARATUS AND BRIGHT POINT CORRECTION METHOD FOR LIQUID CRYSTAL DISPLAY PANEL USING THE SAME

(71) Applicant: V TECHNOLOGY CO., LTD., Yokohama-shi, Kanagawa (JP)

(72) Inventor: Kazuya Otaki, Yokohama (JP)

(73) Assignee: V TECHNOLOGY CO., LTD., Yokohama-shi (JP)

( * ) Notice: Subject to any disclaimer, the term of this patent is extended or adjusted under 35 U.S.C. 154(b) by 159 days.

(21) Appl. No.: 14/022,617

(22) Filed: Sep. 10, 2013

(65) Prior Publication Data

US 2014/0009729 A1    Jan. 9, 2014

Related U.S. Application Data

(63) Continuation of application No. PCT/JP2012/054973, filed on Feb. 28, 2012.

(30) Foreign Application Priority Data

Mar. 11, 2011 (JP) ................................ 2011-053721

(51) Int. Cl.
*B23K 26/066* (2014.01)
*B23K 26/06* (2014.01)
(Continued)

(52) U.S. Cl.
CPC .......... *G02F 1/13306* (2013.01); *B23K 26/066* (2015.10); *B23K 26/0613* (2013.01); *G02F 1/1309* (2013.01); *G02F 1/133509* (2013.01)

(58) Field of Classification Search
CPC ........... B23K 26/0656; B23K 26/0613; B23K 26/073; B23K 26/0732–26/0738; G02F 1/1309; G02F 1/136259
See application file for complete search history.

(56) References Cited

U.S. PATENT DOCUMENTS 7,868,993 B2    1/2011   Lim et al.
2002/0039737 A1*  4/2002   Chan et al. ........................ 435/6
(Continued)

FOREIGN PATENT DOCUMENTS

CN    101446700 A    6/2009
JP    10-020201 A    1/1998
(Continued)

OTHER PUBLICATIONS

IB of WIPO, International Preliminary Report on Patentability and Written Opinion, PCT/JP2012/054973, 14 pages.
(Continued)

*Primary Examiner* — Michael Caley
*Assistant Examiner* — Jia Pan
(74) *Attorney, Agent, or Firm* — Foley & Lardner LLP (57) ABSTRACT

The present invention is a laser irradiation apparatus which is capable of selecting a laser light of a wavelength among a plurality of laser lights having different wavelengths according to a purpose of irradiation and irradiating an object to be irradiated with the laser light having the wavelength. The laser irradiation apparatus includes, on an optical path of a mixed light beam of the plurality of laser lights having different wavelengths, a slit having a width corresponding to a diffraction limit of the laser light having the shortest wavelength among the plurality of laser lights having different wavelengths, and an objective lens for focusing a laser light that has passed through the slit on the object to be irradiated.

3 Claims, 7 Drawing Sheets

(51) Int. Cl.
*G02F 1/13* (2006.01)
*G02F 1/1335* (2006.01)
*G02F 1/133* (2006.01)

(56) References Cited

U.S. PATENT DOCUMENTS

| | | | |
|---|---|---|---|
| 2005/0045090 A1* | 3/2005 | Ikegami | B23K 26/0656 117/8 |
| 2006/0050223 A1* | 3/2006 | Umetsu | 349/192 |
| 2006/0065645 A1* | 3/2006 | Nakasu | B23K 26/34 219/121.68 |
| 2006/0226381 A1* | 10/2006 | Kawabe et al. | 250/559.36 |
| 2008/0218833 A1* | 9/2008 | Son | B23K 26/0656 359/232 |
| 2009/0141231 A1 | 6/2009 | Lim et al. | |
| 2010/0302360 A1* | 12/2010 | Arai et al. | 348/126 |
| 2011/0140007 A1* | 6/2011 | Ogino et al. | 250/492.22 |

FOREIGN PATENT DOCUMENTS

| | | |
|---|---|---|
| JP | 2002-071939 A | 3/2002 |
| JP | 2003-305577 A | 10/2003 |
| JP | 2004-279753 A | 10/2004 |
| JP | 2008-165164 A | 7/2008 |
| JP | 2011-504599 A | 2/2011 |
| WO | WO 2008/156286 A1 | 12/2008 |
| WO | WO 2010/035348 A1 | 4/2010 |

OTHER PUBLICATIONS

Chinese Office Action, Mar. 18, 2015, 12 pages.
Chinese Office Action, Sep. 16, 2015 12 pages.
Chinese Office Action, Application No. 201280010962.4, Feb. 5, 2016, 6 pages.

* cited by examiner

LASER IRRADIATION APPARATUS AND BRIGHT POINT CORRECTION METHOD FOR LIQUID CRYSTAL DISPLAY PANEL USING THE SAME

This application is a continuation application of PCT/JP2012/054973, filed on Feb. 28, 2012.

BACKGROUND OF THE INVENTION

1. Field of the Invention

The present invention relates to a laser irradiation apparatus which is capable of selecting a laser light having a wavelength among a plurality of laser lights having different wavelengths according to the purpose of the irradiation and irradiating an object to be irradiated with the laser light having the wavelength and, in particular, relates to a downsized laser irradiation apparatus capable of extracting from a mixed laser light of a plurality of laser lights having different wavelengths a laser light having the shortest wavelength with high wavelength purity, and a bright point correction method for a liquid crystal display panel using such an apparatus.

2. Description of Related Art

Conventionally, this sort of laser irradiation apparatus is provided with a first laser generator which generates a first laser light having a short wavelength and a second laser generator which generates a second laser light having a longer wavelength than the first laser light. The laser irradiation apparatus is configured to irradiate a liquid crystal cell of a bright defect of a liquid crystal display panel with the first laser light, to make a color filter of the liquid crystal cell peel from a substrate to form a gap between them, and thereafter, irradiate the liquid crystal cell with the second laser light to change the physical properties of the color filter of the liquid crystal cell so that its light transmittance drops (for example, refer to Japanese Laid-open (Kokai) Patent Application Publication No. 2008-165164 A).

However, since such a conventional laser irradiation apparatus has two laser generators for generating two laser lights having different wavelengths, and is configured to switch ON and OFF states of these generators to extract a laser light having a specific wavelength, it is difficult to downsize the apparatus.

On the other hand, it can be considered to generate harmonic waves from basic waves of a single laser generator to obtain a plurality of laser lights having different wavelengths, and thereafter, wavelength-separates the plurality of laser lights having different wavelengths, for example, by using a dichroic mirror, and make the plurality of laser lights having different wavelengths pass through respective optical paths, and open and close each optical path to extract a laser light having specific a wavelength. However, in this method, since the plurality of optical paths is provided so as to spread in the lateral direction, it is not easy to downsize the apparatus.

Further, it is also possible to extract a laser light having a specific wavelength by using a filter from mixed laser lights having different wavelengths which propagate the same optical path; however, due to characteristics of a filter, it is difficult to extract with high wavelength purity, for example, a laser light of 266 nm separately from a laser light having a close wavelength of 355 nm. Accordingly, when, for example, a laser light of 266 nm is used to peel a color filter of a liquid crystal cell of a bright defect in order to correct the bright defect of a liquid crystal display panel, there is a risk that a residual laser light of 355 nm that is not removed by the filter causes a thermal influence on a surrounding area of the liquid crystal cell.

SUMMARY OF THE INVENTION

In view of the above problems, it is an object of the present invention to provide a downsized laser irradiation apparatus which is capable of extracting a laser light having the shortest wavelength with high wavelength purity from mixed laser lights having different wavelengths, and a bright point correction method for a liquid crystal display panel employing such an apparatus.

In order to achieve the abovementioned object, the laser irradiation apparatus according to an aspect of the present invention which is capable of selecting a laser light having a wavelength among a plurality of laser lights having different wavelengths according to a purpose of irradiation and irradiating an object to be irradiated with the laser light having the wavelength, includes, on an optical path of a mixed light beam of the plurality of laser lights having different wavelengths, a slit having at least a width corresponding to a diffraction limit of a laser light having the shortest wavelength among the plurality of laser lights having different wavelengths, and an objective lens for focusing a laser light that has passed through the slit, on the object to be irradiated.

By such a configuration, the mixed light beam of the plurality of laser lights having different wavelengths is made to pass through a slit having at least a width corresponding to the diffraction limit of a laser light having the shortest wavelength, to select a laser light having a wavelength according to the purpose of irradiation from the plurality of laser lights having different wavelengths, and the selected laser light is focused on the object to be irradiated by the objective lens.

It is preferred that the slit includes a first slit having a width corresponding to the diffraction limit of the laser light having the shortest wavelength and a second slit having a width larger than the width of the first slit, the first and second slits being formed so as to be arranged laterally on the optical path of the mixed light beam, and that the laser irradiation apparatus further includes a light-blocking device for opening and closing at least the optical path of the laser light passing through the second slit so that the wavelength of a laser light radiated to the object to be irradiated is selectable.

It is more preferred that the first slit is formed in a central portion of the optical path of the mixed light beam, and the second slit is formed on both sides of the first slit so as to be arranged in parallel thereto.

It is still more preferred that the laser irradiation apparatus includes a plurality of the first slits formed so as to be arranged in parallel to one another.

Further, the bright point correction method for a liquid crystal display panel according to an aspect of the present invention is a method in which first and second laser lights having different wavelengths are used to correct a bright defect of a liquid crystal cell, the method including the steps of: in a state that a mixed light beam of the first and second laser lights is output through the same optical path, peeling a color filter of the liquid crystal cell of the bright defect from a substrate by the first laser light that has selectively transmitted through a first slit having a width corresponding to the diffraction limit of the first laser light having a short wavelength, to form a gap between the color filter and the substrate; scraping off a black matrix in the periphery of the liquid crystal cell of the bright defect by the second laser light having a long wavelength that has passed through a second slit having a width larger than the width of the first slit, to generate black particles; and moving the black particles to diffuse them into the gap by the first laser light that has passed through the first slit or the first and second laser lights that have passed through at least the second slit.

It is preferred that the first and second slits are formed so as to be arranged in parallel on the optical path of the mixed light beam, and the method employs a light-blocking device for opening and closing at least the optical path of the laser light passing through the second slit so that the wavelength of a laser light radiated to the object to be irradiated is selectable.

It is more preferred that the laser irradiation apparatus includes a plurality of the first slits formed so as to be arranged in parallel to one another in a central portion of the optical path of the mixed light beam, and the second slits are formed on both sides of the first slits.

According to a first aspect of the invention, it is possible to extract a laser light having the shortest wavelength from a plurality of laser lights having different wavelengths propagating in the same optical path according to the purpose of irradiation, and downsize the laser irradiation apparatus. Further, since the mixed light beam is made to pass through a slit having a width corresponding to the diffraction limit of the laser light having the shortest wavelength, it is possible to extract from the mixed light beam a laser light having the shortest wavelength with high wavelength purity. Accordingly, unlike conventional techniques, it is possible to carry out a laser processing while eliminating a thermal influence of a laser light having a long wavelength remaining in the extracted laser light having the shortest wavelength, on a surrounding area of the laser irradiation area. Further, by using the laser light having the shortest wavelength, it is possible to make the depth of focus thereof smaller than the depth of focus of a laser light having a long wavelength, and thereby to reduce accumulated thermal energy in the surrounding area of the laser irradiation area. Accordingly, it is possible to stably carry out laser processing of a thin film.

According to a second aspect of the invention, only by opening and closing the light-blocking device, it is possible to extract two sorts of laser lights having different wavelengths from the mixed light beam according to the purpose of irradiation. In this case, it is possible to extract from the first slit a laser light having the shortest wavelength and having the smallest thermal energy with high wavelength purity, and to extract from the second slit laser lights having wavelengths of which diffraction limits correspond to the width of the second slit or shorter and containing the laser light having the shortest wavelength. Accordingly, it is possible to carry out a laser processing by the laser light having the shortest wavelength, that has been extracted by being selectively transmitted through the first slit, while suppressing the thermal influence, and to carry out a laser processing by using the laser light having the longest wavelength and having the largest thermal energy among a plurality of laser lights that have passed through the second slit.

According to a third aspect of the invention, it is possible to widen an irradiation area on the object to be irradiated with the laser light that has passed through the second slit, to improve the efficiency of laser processing.

According to a fourth aspect of the invention, it is possible to widen an irradiation area on the object to be irradiated with the laser light having the shortest wavelength that has passed through the first slit, to improve the efficiency of laser processing while suppressing thermal influence.

According to a fifth aspect of the invention of the bright point correction method for a liquid crystal panel, since the mixed light beam is passed through the first slit having a width corresponding to the diffraction limit of the first laser light having the shortest wavelength, it is possible to extract the first laser light having the shortest wavelength from the mixed light beam with high wavelength purity. Accordingly, unlike conventional techniques, it is possible to carry out laser processing while eliminating thermal influence of the second laser light having a long wavelength remaining in the extracted first laser light on a surrounding area of the laser irradiation area. Further, by using the first laser light having the shortest wavelength, it is possible to reduce the depth of focus from that of the second laser light having a long wavelength, thereby to reduce an accumulated thermal energy in a surrounding area of the laser irradiation area. Accordingly, it is possible to stably carry out a peeling process of a color filter. Meanwhile, a scraping process of a black matrix can be carried out by, among the first and second laser lights that have passed through the second slit, the second laser light having a large thermal energy.

According to a sixth aspect of the invention, only by opening and closing the light-blocking device, it is possible to extract two sorts of laser lights having different wavelengths from the mixed light beam according to the purpose of irradiation.

According to a seventh aspect of the invention, it is possible to widen respective irradiation areas of the first laser light and the second laser light radiated to a liquid crystal display panel. Accordingly, it is possible to improve the efficiency of a peeling process of a color filter by the first laser light and a scraping process of a black matrix by the second laser light. Accordingly, it is possible to reduce a takt time of a correction process of bright defects of liquid crystal display panels to increase its throughput.

DESCRIPTION OF THE PREFERRED EMBODIMENTS

Figure 1:
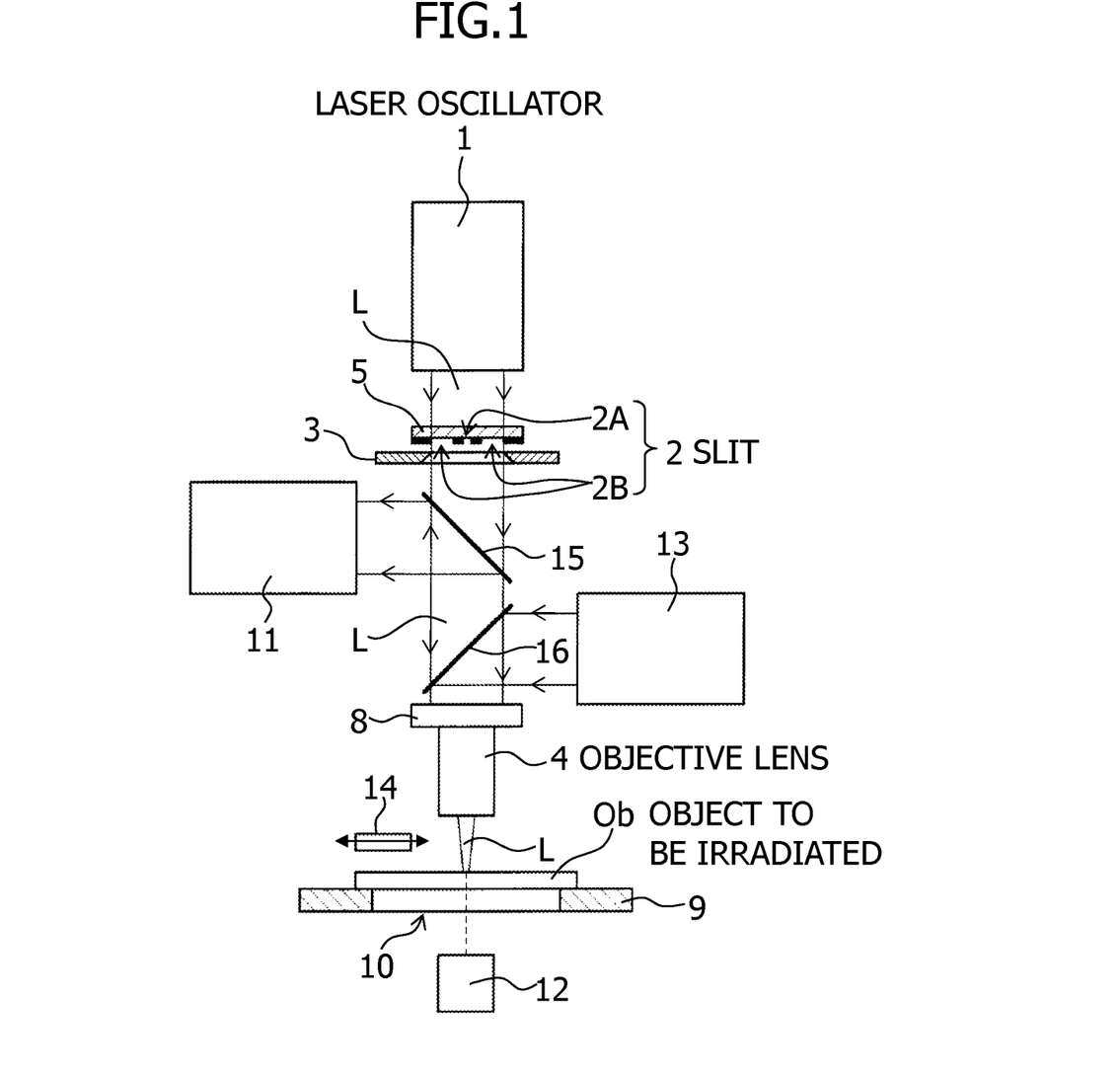
FIG. 1 is a front view illustrating an embodiment of a laser irradiation apparatus according to the present invention.

Hereunder, embodiments of the present invention will be described in detail with reference to the attached drawings. FIG. 1 is a front view illustrating an embodiment of a laser irradiation apparatus according to the embodiment of the present invention. This laser irradiation apparatus is configured to select a laser light having a wavelength among a plurality of laser lights having different wavelengths according to the purpose of irradiation and to irradiate an object to be irradiated with the selected laser light, and the apparatus includes a laser oscillator 1, a slit 2, a light-blocking device 3 and an objective lens 4.

The above laser oscillator 1 produces a plurality of laser lights having different wavelengths, which is, for example, a solid-state YAG laser or an excimer laser and configured to produce from a fundamental wave of 1064 nm a first laser light that is a fourth harmonic wave of 266 nm and a second laser light that is a third harmonic wave of 355 nm, and to output a mixed light beam. Further, the laser oscillator 1 has a beam expander which expands a beam diameter to sufficiently cover a forming region of a slit 2 provided on a mask 5 to be described later.

On an optical path of the laser light L, the second slit 2 is provided. This slit 2 selectively separates at least the first laser light from the mixed light beam of the first and second laser lights to output the separated first laser light. The slit 2 is a slit-shaped aperture having a width corresponding to the diffraction limit of the first laser light, which is formed through a light-blocking film coated on a transparent substrate to form a mask 5.

In more detail, the slit 2 includes a first slit 2A having a width corresponding to the diffraction limit of the first laser light (266 nm) and a second slit 2B having a width corresponding to the diffraction limit of the second laser light (355 nm), and the first and second slits 2A and 2B are arranged laterally on the optical path of the laser light L. In this case, it is a matter of course that the width of the first slit 2A is narrower than the width of the second slit 2B.

Figure 2:
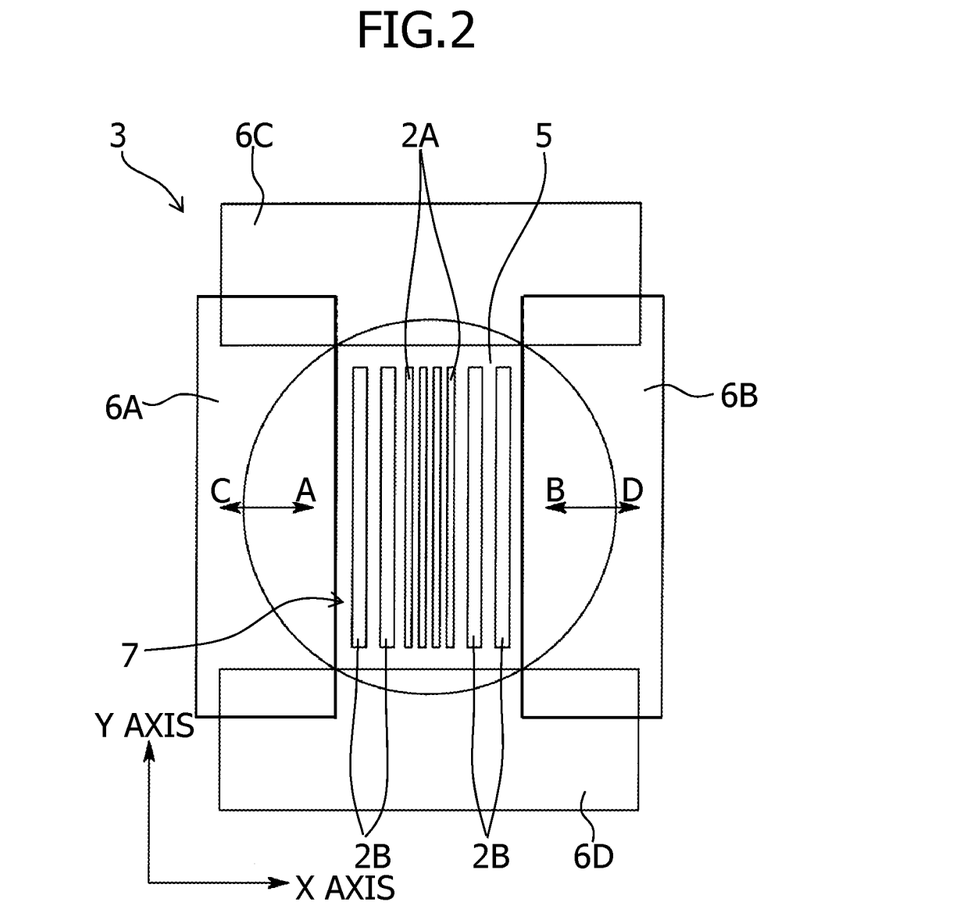
FIG. 2 is a perspective plan view illustrating a positional relationship between a slit and a light-blocking device in the above embodiment.

In more detail, as illustrated in FIG. 2, in the central portion of the laser light irradiation area (in a circle indicated in FIG. 2) on the mask 5, a plurality of first slits 2A are formed so as to be arranged in parallel, and a plurality of second slits 2B are formed on both sides of the plurality of first slits so as to be in parallel thereto. By such a configuration, it is attempted to widen the irradiation area of the first and second laser lights radiated to an object Ob to be irradiated, to improve the efficiency of laser processing.

Here, when the fundamental wave of 1064 nm is eliminated in advance, the second slit 2B may have a width larger than a width corresponding to the diffraction limit of the second laser light (355 nm).

On a side of the mask 5 from which the laser light L is output, a light-blocking device 3 is provided. This light-blocking device 3 opens and closes a path of the laser light L passing through the second slit 2B provided on the mask 5, and includes four strip-shaped light-blocking plates 6A, 6B, 6C and 6D arranged in a quadrangle frame shape so as to form an aperture 7 in the center, and the light-blocking plates 6A to 6D are configured to be movable in their respective short axis directions (X axis and Y axis directions). In this case, the path of the laser light L passing through the second slit 2B is opened and closed by the above light-blocking plates 6A and 6B, and the longitudinal length of the laser light L radiated on the object Ob to be irradiated is adjusted by the light-blocking plates 6C and 6D. Here, FIG. 1 illustrates a case in which the light-blocking device 3 is provided on the side of the mask 5 from which the laser light L is output, but it may be provided on a side of the mask 5 into which the laser light L is input.

On the optical path of the laser light L, an objective lens 4 is provided so as to oppose to the object Ob to be irradiated. This objective lens 4 is a lens for focusing the first and second laser lights that have passed through the first and second slits 2A and 2B in the mask 5, onto the object Ob to be irradiated. A plurality of objective lenses 4 are attached to a revolver 8 so that one of such objective lenses is selectable according to the purpose of irradiation with the laser light L. For example, in a case of a purpose of peeling (lift-off) a thin film from a substrate by using the first laser light of 266 nm, it is preferred to select and use an objective lens 4 of UV20X or 50X, and in a case of using a second laser light of 355 nm to scrape, for example, a black matrix made of an organic material of a liquid crystal panel, it is preferred to select and use an objective lens 4 of NUV20X or 50X. In this case, an imaging position of the objective lens 4 and the position of the mask 4 are conjugate to each other.

Here, in FIG. 1, a reference numeral 9 denotes a stage for placing thereon the object Ob to be irradiated, which has an aperture 10 formed so as to correspond to an observation area on the object Ob to be irradiated so that a rear illumination light can pass through. Further a reference numeral 11 denotes a CCD camera for observing a laser processing area or observing a laser processing state on the object Ob to be irradiated. Further, a reference numeral 12 denotes a rear illumination light source for illuminating an object Ob to be irradiated, such as a liquid crystal display panel, from its rear side to detect liquid crystal cells of bright defects. Further, a reference numeral 13 denotes an epi-illuminator for illuminating, for example, a liquid crystal display panel from its front side so as to allow observation of correction state of the liquid crystal cells of bright defects. Further a reference numeral 14 denotes a polarized light observation device that is inserted in an optical path of the epi-illuminator 13 to facilitate observation of, for example, a peeling state of a color filter in the liquid crystal cell of a bright defect. Further a reference numeral 15 denotes a dichroic mirror that is inserted in an optical path of the laser oscillator 1 in order to observe a surface of the object Ob to be irradiated by using the CCD camera 11, and the dichroic mirror 15 transmits ultraviolet rays and reflects visible light. A reference numeral 16 denotes a dichroic mirror that is inserted in an optical path of the laser oscillator 1 in order to guide illumination light emitted from the epi-illuminator 13 to the object Ob to be irradiated, and the dichroic mirror 16 transmits ultraviolet rays and reflects visible light.

Figure 3:
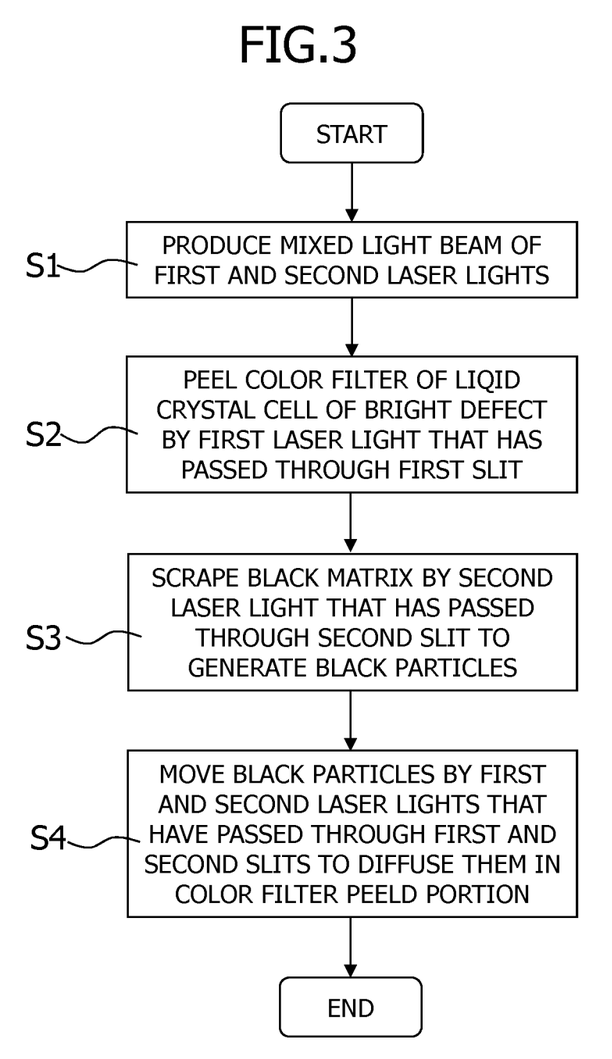
FIG. 3 is a flowchart illustrating the bright point correction method for a liquid crystal display panel of the present invention.

Next, operation of the laser irradiation apparatus having such a construction and a bright point correction method for a liquid crystal display panel using such an apparatus will be described with reference to a flowchart shown in FIG. 3. Here, description will be made with respect to a case in which a liquid crystal cell of a bright defect of the liquid crystal display panel has already been detected.

First, in step S1, in a state that the power of the laser oscillator 1 is set to a level at which a blue color filter 20B can be peeled by a first laser light (266 nm) to be described later, the laser oscillator generates from a fundamental wave of 1064 nm a first laser light of 266 nm, that is a fourth harmonic wave, and a second laser light of 355 nm, that is a third harmonic wave, and outputs mixed light beam thereof in the same optical path. Further, the mixed light beam is expanded to sufficiently cover a forming area of the slit 2 formed in the mask 5.

Next, in step S2, the mixed light beam output from the laser oscillator 1 is radiated to the mask 5 having a first slit 2A formed in the central portion of the irradiation area and second slits 2B formed so as to be arranged on both sides of the first slit 2A. At this time, the light-blocking device 3 is in a state that the light-blocking plates 6A and 6B have moved in arrow A and B directions, respectively, along the X-axis direction as illustrated in FIG. 2 so as to close the path of the laser light L passing through the second slit 2B.

In this embodiment, since the first slit 2A is formed to have a width corresponding to the diffraction limit of the first laser light (266 nm), in the mixed light beam radiated to the mask 5, the first laser light (266 nm) can be transmitted through the first slit 2A but a laser light of fundamental waves (1064 nm)

and the second laser light (355 nm), that have longer wavelengths than that of the first laser light, cannot be transmitted through the first slit 2A.

Meanwhile, since the second slit 2B is formed to have a width corresponding to the diffraction limit of the second laser light (355 nm), in the mixed light beam radiated to the mask 5, the first laser light (266 nm) and the second laser light (355 nm) can be transmitted through the second slit 2B but a laser light of fundamental waves (1064 nm), that has longer wavelength than that of the second laser light, cannot be transmitted through the second slit 2B.

Figure 4:
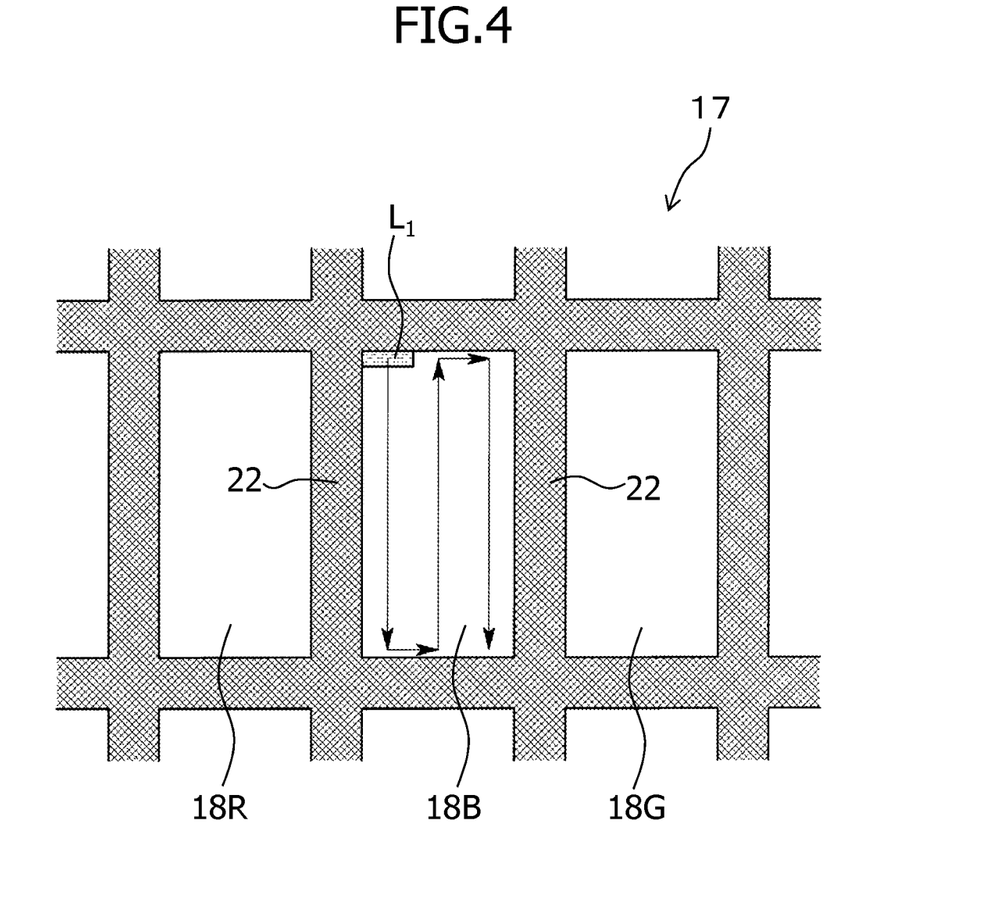
FIG. 4 is a plan view illustrating the step of peeling a color filter to form a gap in the abovementioned bright point correction method.

Accordingly, in step S2, since the path of the laser light L passing through the second slit 2B is closed by the light-blocking device 3 as described above, in the laser light L that have transmitted through the slits 2 of the mask 5, the first laser light and the second laser light, that have been transmitted through the second slits 2B, are blocked by the light-blocking device 3, and, as illustrated in FIG. 4, only the first laser light $L_1$, that has been transmitted through the first slit 2A, passes through the objective lens 4 to be radiated to a liquid crystal cell 18B corresponding to blue (B) of a bright defect of a liquid crystal display panel 17 being an object Ob to be irradiated. Here, in FIG. 4, a reference numeral 18R denotes a liquid crystal cell corresponding to red (R) and a reference numeral 18G denotes a liquid crystal cell corresponding to green (G).

Figure 5:
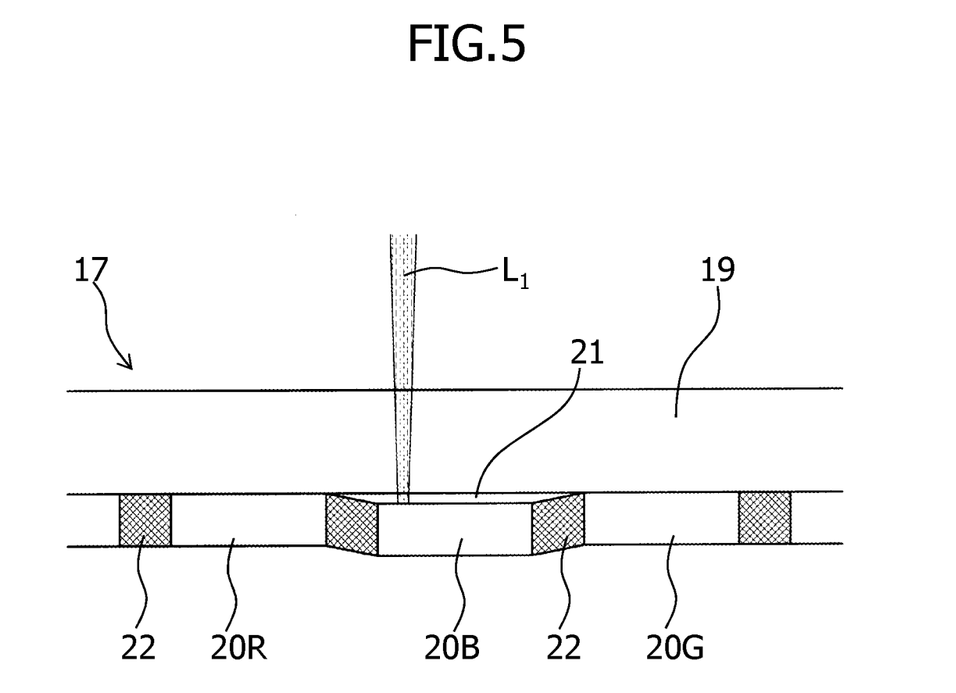
FIG. 5 is a side view of FIG. 4.

In this case, the first laser light $L_1$ is, as illustrated in FIG. 5, transmitted through a transparent electrode substrate 19 and focused, for example, in the vicinity of an interface between a blue color filter 20B and an opposite electrode substrate 19 that is coated with the blue color filter 20B in a liquid crystal cell of the bright defect. As a result, a portion of the blue color filter 20B in the vicinity of the interface is thermally decomposed to cause peeling of the blue color filter 20B from the opposite electrode substrate 19, to form a gap 21 between the blue color filter 20B and the opposite electrode substrate 19. Here, in FIG. 5, a reference numeral 20R denotes a red color filter and 20G denotes a green color filter.

Further, a stage 9 is moved in a plane parallel to XY plane relatively to the objective lens 4, to scan the first laser light L1 in the liquid crystal cell 18B of the bright defect as indicated by the arrows in FIG. 4. Thus, as illustrated in FIG. 5, the entirety of the blue color filter 20B of the above liquid crystal cell 18B is peeled from the opposite electrode substrate 19.

Figure 6:
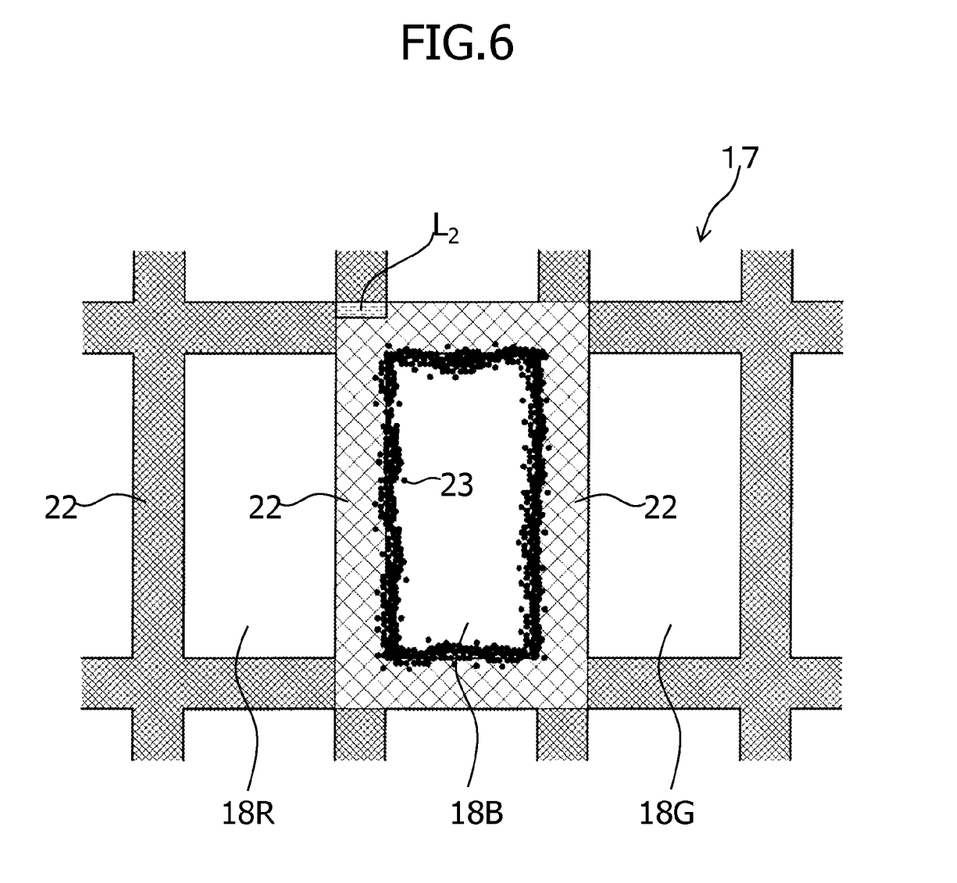
FIG. 6 is a plan view illustrating the step of scraping a black matrix to generate black particles in the abovementioned bright point correction method.

Next, in step S3, the power of the laser oscillator 1 is raised to a level at which the second laser light $L_2$ can scrape a black matrix 22 to be described later, and the light-blocking plates 6A and 6B of the light-blocking device 3 are moved in the directions of arrows C and D illustrated in FIG. 2 along X-axis to open the path of the laser light L passing through the second slit 2B, so that the second laser light $L_2$ that has passed through the second slit 2B is radiated to the black matrix 22 made of an organic material in the periphery of the liquid crystal cell 18B of the bright defect as illustrated in FIG. 6. Further, while the stage 9 is moved in the plane parallel to XY plane relatively to the objective lens 4, a part of the black matrix 22 is scraped to generate black particles 23. In this case, the first laser light $L_1$ that has passed through the first and second slits 2A and 2B is also radiated to the black matrix 22. However, since the first laser light $L_1$ is smaller than the second laser light $L_2$ in the thermal energy, the first laser light $L_1$ does not contribute to scraping of the black matrix 22.

Figure 7:
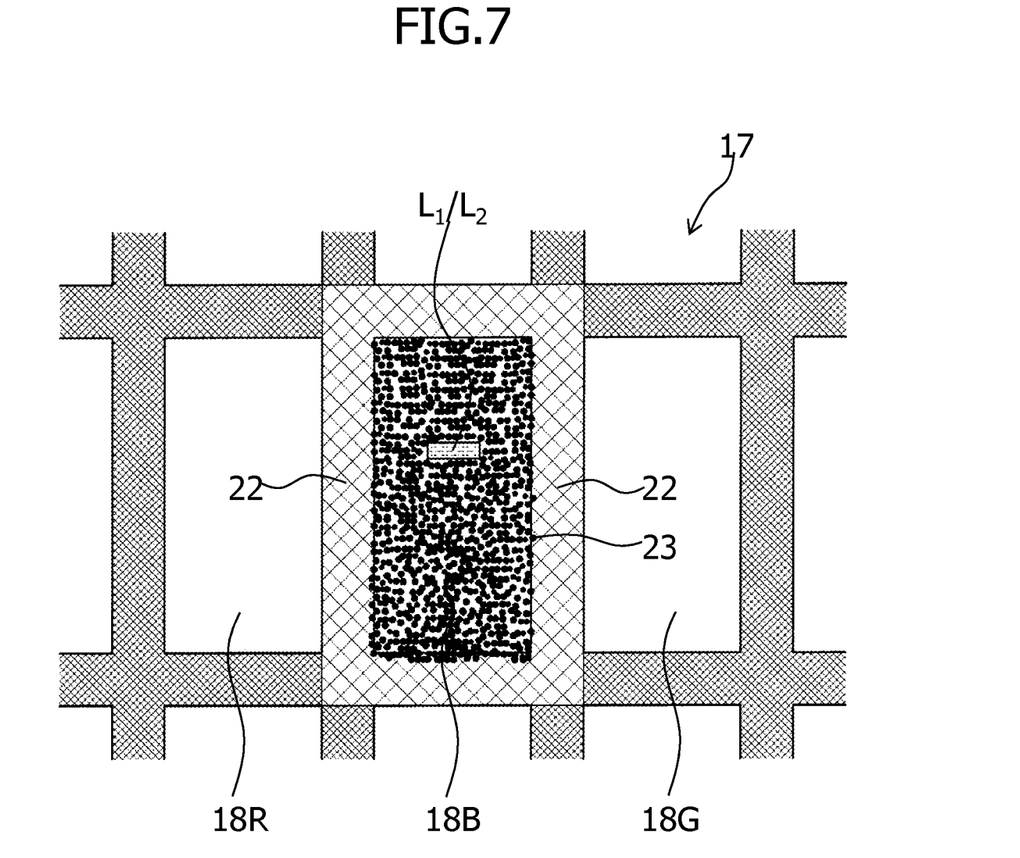
FIG. 7 is a plan view illustrating the step of diffusing the black particles into the gap in the abovementioned bright point correction method.

Subsequently, in step S4, in a state that the power of the laser oscillator 1 is lowered to a level at which the second laser light $L_2$ does not scrape the black matrix 22, the stage 9 is moved in plane parallel to XY plane relatively to the objective lens 4 to scan the first laser light $L_1$ that has been transmitted through the first slit 2A and the first and second laser lights $L_1$ and $L_2$ that have been transmitted through the second slit 2B, to thereby move the above black particles 23 from the black matrix 22 to the above liquid crystal cell 20B side to diffuse them substantially uniformly in the above gap as illustrated in FIG. 7. Accordingly, it is possible to reduce the light transmittance of the liquid crystal cell 20B of the bright defect to reduce visibility of the bright defect.

Here, in the above embodiment, explanation has been made with respect to a case in which the black particles 23 are moved by the first and second laser lights $L_1$ and $L_2$, but the present invention is not limited thereto, and in step S4, in a state that the path of the laser light L passing through the second slit 2B is closed by the light-blocking device 3, only the first laser light $L_1$ that has passed through the first slit 2A may be used to move the black particles 23.

Further, in the above embodiment, explanation has been made with respect to a case in which the first and second slits 2A and 2B are each constituted by a plurality of slits 2, but the first and second slits 2A and 2B may be each a single slit.

Further, in the above embodiment, explanation has been made with respect to a case in which the first slit 2A and the second slit 2B are arranged on the optical path of the laser light L and the light-blocking device 3 opens and closes the optical path of the laser light L passing through the second slit 2B. However, the present invention is not limited thereto, and the construction may be such that, without providing the light-blocking device 3, a first slit 2A and a second slit 2B are formed with sufficient distance and configured to be movable alternately into place to switch them.

Further, in the above embodiment, explanation has been made with respect to a case in which the first and second slits 2A and 2B are apertures formed in the mask 5, but the present invention is not limited thereto and they may be through holes having elongated cross-sectional shapes formed in a metal plate.

Further, in the above embodiment, explanation has been made with respect to a case in which a diffraction-limit light of the first slit 2A is used to peel a blue color filter 20B of a liquid crystal display panel 17, but the present invention is not limited thereto, and the present invention is applied to lift-off of a thin film in a production process of e.g. semiconductor substrates.

Further, in the above explanations, description has been made with respect to a bright point correction method for a liquid crystal display panel employing the laser irradiation apparatus of the present invention, but the present invention is not limited thereto, and the laser irradiation apparatus may be any one so long as it is configured to irradiate an object to be irradiated with a laser light having a wavelength selected from a plurality of laser lights having different wavelengths according to the purpose of irradiation.

It should be noted that the entire contents of Japanese Patent Application No. 2011-053721, filed on Mar. 11, 2011, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A laser irradiation apparatus which selects a laser light having a wavelength among a plurality of laser lights having different wavelengths according to a purpose of irradiation and irradiates an object to be irradiated with the laser light having the wavelength, the laser irradiation apparatus comprising: on an optical path of a mixed light beam of the plurality of laser lights having different wavelengths, a plurality of slits having different widths, the plurality of slits comprising a slit having a width corresponding to a diffraction limit of a laser light having the shortest wavelength among the plurality of laser lights having different wavelengths, the laser light having the shortest wavelength being used to peel a thin film deposited on a substrate, a light-blocking device for opening and closing the optical path of the laser light; and an objective lens for focusing the laser light that has passed through the plurality of slits, on the object to be irradiated, wherein the plurality of slits comprises a first slit having the width corresponding to the diffraction limit of the laser light having the shortest wavelength and second slits having widths larger than the width of the first slit, the first slit is formed in a central portion of the optical path of the mixed light beam, and the second slits are formed on both sides of the first slit so as to be arranged in a lateral manner such that the longitudinal axis of the first slit and the longitudinal axes of the second slits are in parallel, and wherein the light-blocking device opens and closes at least the optical path of the laser light passing through at least one of the second slits so that the wavelength of a laser light radiated to the object to be irradiated is selectable.

2. The laser irradiation apparatus according to claim 1, wherein the laser irradiation apparatus comprises a plurality of the first slits formed so as to be arranged in parallel to one another.

3. A bright point correction method for a liquid crystal display panel, for correcting a bright defect of a liquid crystal cell by using the laser irradiation apparatus according to claim 1, the method comprising the steps of: in a state that a mixed light beam of first and second laser lights having different wavelengths is output through the same optical path, peeling a color filter of the liquid crystal cell of the bright defect from a substrate by the first laser light that has selectively transmitted through the first slit having the width corresponding to the diffraction limit of the laser light having the shortest wavelength and being formed in the central portion of the optical path of the mixed light beam, to form a gap between the color filter and the substrate;

scraping off a black matrix in the periphery of the liquid crystal cell of the bright defect by the second laser light having a long wavelength that has passed through the second slits having the widths larger than the width of the first slit and being formed on both sides of the first slit so as to be arranged in the lateral manner such that the longitudinal axis of the first slit and the longitudinal axes of the second slits are in parallel, to generate black particles; and moving the black particles to diffuse them into the gap by the first laser light that has passed through the first slit or the first and second laser lights that have passed through at least the second slits.

\* \* \* \* \*